United States Patent [19]
Haaland

[11] Patent Number: 5,637,935
[45] Date of Patent: *Jun. 10, 1997

[54] DOUBLE-DUCT LIQUID METAL MAGNETOHYDRODYNAMIC ENGINE

[75] Inventor: Carsten M. Haaland, Oak Ridge, Tenn.

[73] Assignee: Martin Marietta Energy Systems, Inc., Oak Ridge, Tenn.

[*] Notice: The term of this patent shall not extend beyond the expiration date of Pat. No. 5,473,205.

[21] Appl. No.: 238,281

[22] Filed: May 5, 1994

Related U.S. Application Data

[63] Continuation-in-part of Ser. No. 217,145, Mar. 24, 1994, Pat. No. 5,473,205.
[51] Int. Cl.$^6$ .................................................. H02K 44/18
[52] U.S. Cl. .................................................. 310/11
[58] Field of Search .................................................. 310/11

[56] References Cited

FOREIGN PATENT DOCUMENTS

88/05223  7/1988  WIPO .................................................. 310/11

OTHER PUBLICATIONS

Sutton, George W. et al. Electrical and Pressure Losses in a Magnetohydrodynamic Channel Due to End Current Loops, Transactions of AIEE, Jan. 1962 pp. 687–695.
Haaland, Carsten M. Electric Power Generation by Steady Flow Liquid Metal MHD Generators IEEE Int'l Conf. on Plasma Science, Jun. 1991 pp. 1–6.
Elliot, David G. Direct Current Liquid–Metal Magnetohydrodynamic Power Generation, AIAA Journal, Apr. 1966, pp. 627–634.

Primary Examiner—Steven L. Stephan
Assistant Examiner—Judson H. Jones
Attorney, Agent, or Firm—Edward A. Pennington; James M. Spicer; Harold W. Adams

[57] ABSTRACT

An internal combustion, liquid metal (LM) magnetohydrodynamic (MHD) engine and an alternating current (AC) magnetohydrodynamic generator, are used in combination to provide useful AC electric energy output. The engine design has four pistons and a double duct configuration, with each duct containing sodium potassium liquid metal confined between free pistons located at either end of the duct. The liquid metal is forced to flow back and forth in the duct by the movement of the pistons, which are alternatively driven by an internal combustion process. In the MHD generator, the two LM-MHD ducts pass in close proximity through a Hartmann duct with output transformer. AC power is produced by operating the engine with the liquid metal in the two generator ducts always flowing in counter directions. The amount of liquid metal maintained in the ducts may be varied. This provides a variable stroke length for the pistons. The engine/generator provides variable AC power at variable frequencies that correspond to the power demands of the vehicular propulsion. Also the engine should maintain nearly constant efficiency throughout the range of power usage. Automobiles and trucks could be powered by the invention, with no transmission or power converter devices being required.

24 Claims, 5 Drawing Sheets

DOUBLE-DUCT LIQUID METAL MAGNETOHYDRODYNAMIC ENGINE

FIELD OF THE INVENTION

This is a continuation-in-part of U.S. Ser. No. 08/217,145, filed Mar. 24, 1994, now U.S. Pat. No. 5,473,205.

The present invention relates generally to liquid metal magnetohydrodynamic engines and, more specifically, to a flow conduit network and drive mechanism for moving liquid metal through a magnet to produce electricity. The drive mechanism includes variable stroke reciprocating pistons driven by internal combustion, and the flow conduit network includes a double-duct which passes liquid metal through a magnet in opposite directions to produce electric current. The use of a variable stroke enables the engine displacement to be varied in size upon demand, thus allowing the production of variable power at variable frequencies corresponding to specific power demands.

BACKGROUND OF THE INVENTION

In general, a magnetohydrodynamic (MHD) system uses a liquid metal moving through a magnetic field to produce electricity. Examples of such systems include U.S. Pat. No. 4,749,890 to Houston, in which the fluid is pumped to an elevated collection zone and a motive force is generated by cyclically heating and cooling a portion of the liquid. The fluid moves through the system by gravity.

U.S. Pat. No. 4,599,551 to Wheatley discloses a thermoacoustic MHD electrical generator which includes an irreversible thermoacoustic heat engine coupled to a MHD electrical generator. The engine is positioned in the field of a magnet and is oriented such that the liquid metal oscillates in a direction orthogonal to the field of the magnet, thus producing an alternating electrical potential.

U.S. Pat. No. 4,703,207 to Bodine discloses an alternating current MHD generator in which a pair of resonant combustion chambers are interconnected by a narrow channel. Shock waves formed in the combustion chambers move ionized gas from chamber to chamber. A magnetic field is set up around the narrow channel so that the moving gas produces an alternating current.

U.S. Pat. No. 4,785,209 to Sainsbury discloses a MHD generator having a pair of primary chambers containing a quantity of fluid heated by a heat source. The primary chambers are interconnected at their lower ends by a channel incorporating a MHD cell, and fluid movement is established through cyclic heating and cooling the working fluid.

Conventional reciprocating piston-type internal combustion engines, such as those used in automobiles, require the incorporation of a power transmission to produce work in the form of locomotion. Energy is consumed, and thus efficiency is lost, during the conversion.

Reciprocating engines used to operate electric generators must rely on throttle control (r.p.m.s) to vary electrical output. However, the use of throttle control will require the engine to operate at less than optimal speeds in terms of fuel efficiency and engine wear mode.

The main problem with existing AC generators is that the designs require a constant frequency, which is not suitable for vehicular propulsion without complicated and heavy electric power handling interfaces between the generator and the propulsion motors. A DC generator could be driven by a combustion engine, but then the problem of throttling down the engine to lower speeds results, and there are many problems with high power DC generators involving commutators and brushes. Furthermore, an internal combustion engine combined with a DC generator cannot provide variable power at one frequency unless one introduces the complicated and heavy electric power handling interface.

Magnetic energy may also be converted to electrical energy by linear actuators as disclosed in U.S. Pat. Nos. 3,891,874 to Roters, 4,349,757 to Bhate, 4,602,174 to Redlich, and "Optimal Design of a Tubular Permanent Magnetic Linear Actuator", by S. A. Nasar and C. Chen Electric Machines Power Systems, Vol. 14, pp.249–259, 1988. These linear actuators use an oscillating tube, with permanent magnetic inserts within the tube, to produce the desired electrical power. Linear actuators which incorporate an oscillating metallic tube design have limited stroke lengths. The stroke length is limited by the requirement that the diameter of the oscillating tube must increase as the stroke length increases, and vice-versa. This limitation is further defined by restrictions on the physical dimensions of oscillating permanent magnets constructed of modern high magnetization materials, such as ferrites, which are inherently brittle and lack structural strength. S. G. Carlqvist et al. disclose the necessity for providing an even number of linear actuators operating in opposing motion to substantially prevent vibration of the generator. "Study of 4-Cylinder, Double-Acting and Hermetic Sealed Stirling Engine", Proceedings of the 25th International Energy Conversion Engineering Conference, Reno, Nevada, Aug. 12–17, 1990, Vol. 6, pp.323–328.

The generators discussed above fail to disclose an apparatus capable of providing the variable power at variable frequencies necessary to power a vehicle (i.e., automobiles and trucks).

SUMMARY OF THE INVENTION

An object of the present invention is to provide an electricity-generating system that eliminates rotating machinery.

Another object of the present invention is to provide an electricity-generating system that eliminates load-bearing sliding surfaces.

Another object of the present invention is to provide a liquid metal, magnetohydrodynamic generator that circulates liquid metal through the generator region at high pressure and high velocity without requiring any gas separation.

A further object of the present invention is to provide a magnetohydrodynamic machine having oscillating free pistons of variable stroke length and stroke frequency.

These and other objects are achieved by providing a magnetohydrodynamic apparatus which includes first duct means for containing a quantity of liquid metal, second duct means for containing a quantity of liquid metal, means for imparting reciprocating motion in the liquid metal contained in the first and second ducts in opposite directions, and means for imposing a magnetic field on a portion of the first and second duct means, thereby generating an AC electric potential.

Other objects, advantages and salient features of the invention will become apparent from the following detailed description, which, taken in conjunction with the annexed drawings, discloses preferred but non-limiting embodiments of the invention.

DETAILED DESCRIPTION OF THE INVENTION

Figure 1:
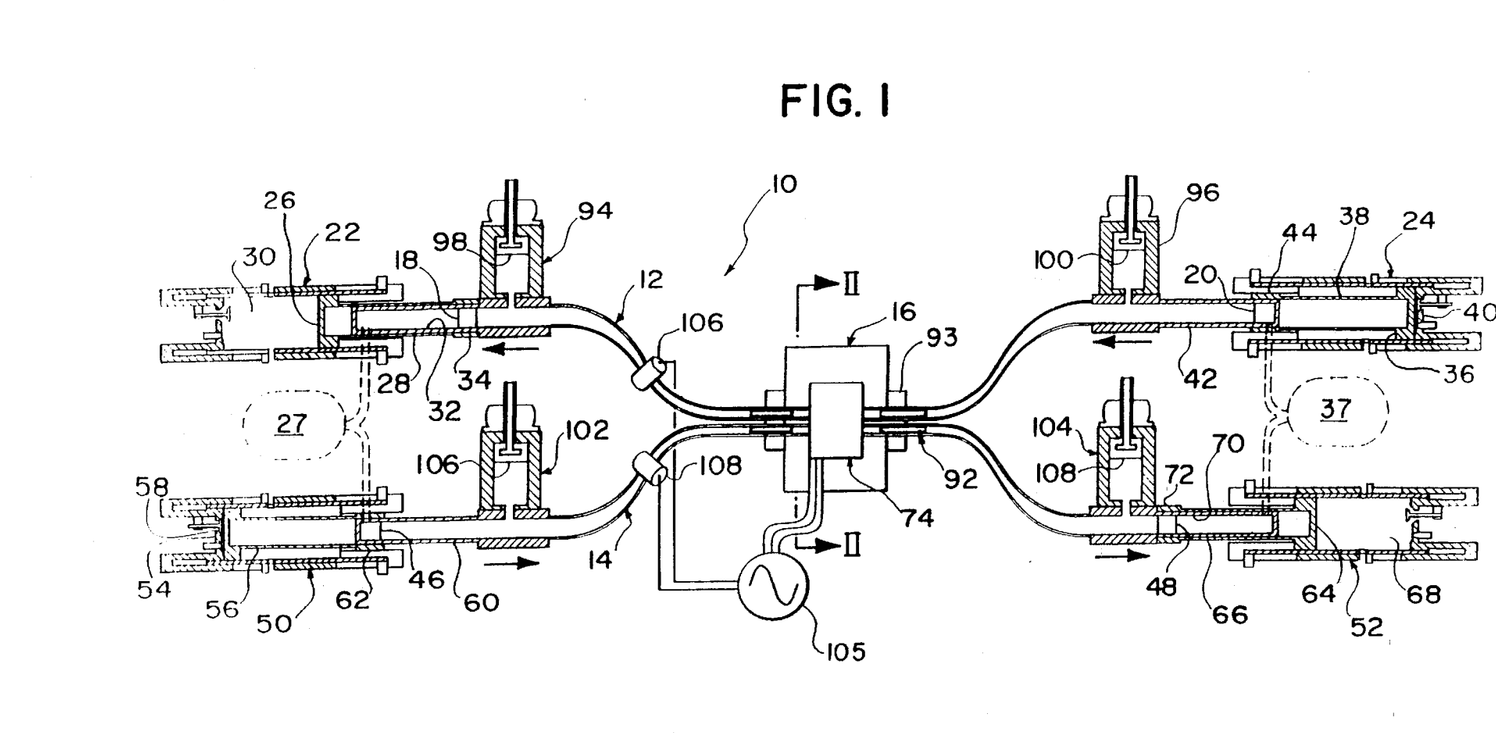
FIG. 1 is a schematic view, partially in vertical cross-section, of a preferred embodiment of the subject invention.

Referring to FIG. 1, a magnetohydrodynamic apparatus 10 includes a first duct 12 for containing a quantity of liquid metal, such as a sodium-potassium liquid metal, and a second duct 14 for containing a quantity of liquid metal. The two quantities of liquid metal are isolated from each other, but pass in proximity to each other in the gap of a permanent magnet 16. The permanent magnet 16 generates a magnetic field through which the liquid metal of the two ducts 12 and 14 pass in opposite directions, as indicated by the directional arrows.

The liquid metal in the duct 12 is confined between two pistons 18 and 20 which are caused to synchronously reciprocate in the end portions of the duct 12 by suitable means, such as an internal combustion engine. The engine includes first and second combustion cylinders 22 and 24 for respectively driving the fluid pistons 18 and 20. For the combustion cylinder 22, a piston 26 having an integrally formed hollow shank 28 reciprocates within a combustion chamber 30. The hollow shank 28 slidably engages an end portion 32 of the duct 12. The end portion 32 is made of an electrically non-conductive material.

Figure 1A:
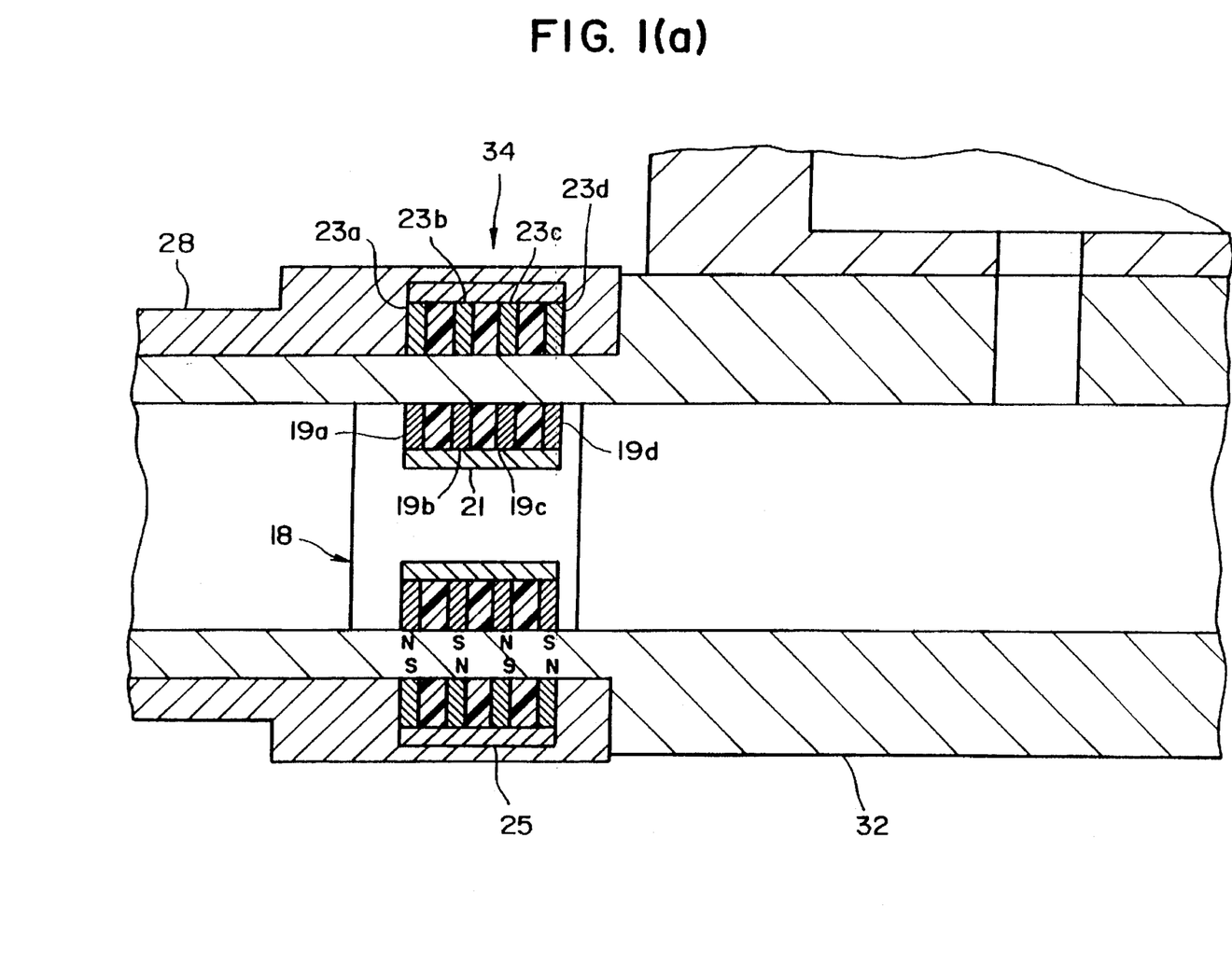
FIG. 1(a) is an enlarged, vertical cross-sectional view showing a magnetic coupling used in the FIG. 1 embodiment.

The piston 18 is coupled to the shank 28 by a magnetic coupling 34, shown in greater detail in FIG. 1(a). The coupling 34 includes a plurality of radially magnetized magnetic rings 19a, 19b, 19c, and 19d, each having opposite inner and outer annular magnetic poles (the outer poles being designated by the letters "n" and "s"). The rings are mounted on an iron cylinder 21 and spaced apart by non-ferrous spacers.

A plurality of radially magnetized outer magnetic rings 23a, 23b, 23c, and 23d are mounted in the shank 28. These likewise have inner and outer annular magnetic poles, the inner poles being designated by the letters "s" and "n". The outer rings are mounted on an iron cylinder 25. The piston 18 will be caused to move with movement of the shank due to the magnetic attraction between the inner and outer magnetic rings. (Note that the end portion 32 of the duct 12 is made of non-ferrous material). Of course, other suitable coupling means can be used. The magnetic rings are made of any suitable material, such as a NdFeB alloy.

Combustion cylinder 24 is identical to combustion cylinder 22, and includes a piston 36 having an integrally formed hollow shank 38, and a combustion chamber 40. An end portion 42 of the duct 12 is made of electrically non-conductive material. A permanent magnet 44 is fixedly connected to the shank to form a magnetic coupling between the piston 20 and the shank 38.

The liquid metal in the duct 14 is confined between two pistons 46 and 48 which are caused to synchronously reciprocate in the end portions of the duct 14 by the internal combustion engine. The engine includes two additional Combustion cylinders 50 and 52 for respectively driving the fluid pistons 46 and 48. For the combustion cylinder 50, a piston 54 having an integrally formed hollow shank 56 reciprocates within a combustion chamber 58. The hollow shank 56 slidably engages an end portion 60 of the duct 14. The end portion 60 is made of an electrically non-conductive material. The piston 46 is coupled to the shank 56 by a magnetic coupling which includes a permanent magnet 62 fixedly connected to the shank 56. The piston 46 is made of material influenced by the field of the magnet 62 to the extent that reciprocating movement of the magnet 62 will impart reciprocating movement in the piston 46.

Combustion cylinder 52 is identical to combustion cylinder 50, and includes a piston 64 having an integrally formed hollow shank 66, and a combustion chamber 68. An end portion 70 of the duct 14 is made of electrically nonconductive material. A permanent magnet 72 is fixedly connected to the shank to form a magnetic coupling between the piston 48 and the shank 66.

In FIG. 1, the oscillating free piston 36 is at its maximum inward position, or in the top dead center full compression position when the oscillating free piston 26 is at its maximum outward position, or in the full expansion position. Alternately firing combustion cylinders 22 and 24 will result in oscillating movement of liquid metal through the duct 12. Similarly, the oscillating free piston 64 is at its maximum outward position, or in the full expansion position, when the oscillating free piston 54 is in the maximum inward position, or in the top dead center full compression position. Combustion cylinders 24 and 50 are timed to fire together, while combustion cylinders 22 and 52 are timed to fire together, thereby resulting in simultaneous flow of liquid metal in opposite directions through the two ducts 12 and 14.

Since the motion of the combustion pistons 26, 36, 54, and 64 is coupled to the fluid-driving pistons 18, 20, 46, and 48 through magnetic couplings acting through the wall of the ducts, the liquid metal in both ducts 12 and 14 can remain hermetically sealed. Isolation of the liquid metal system from the atmosphere and combustion gases could also be obtained by using a high-pressure inert-gas bearing or other suitable means.

An oscillating pressure, or possibly a vacuum, may be formed in the regions behind pistons 18 and 48 in the volume on the other side of the piston from the liquid metal. If this oscillating pressure results in a problem, it could be relieved by running a tube across from cylinder 32 to cylinder 60 at one end and from cylinder 42 to 70 at the other end, with a buffer tanks 27 and 37 containing argon gas in between. These tanks are illustrated in FIG. 1 in broken lines.

Should any liquid metal escape through the seals between the pistons and cylinders and collect in the volumes of oscillating pressure, a small electromagnetic pump (using the reverse of the Hartmann principle) could be used to move this liquid metal into the reservoirs.

Figure 2:
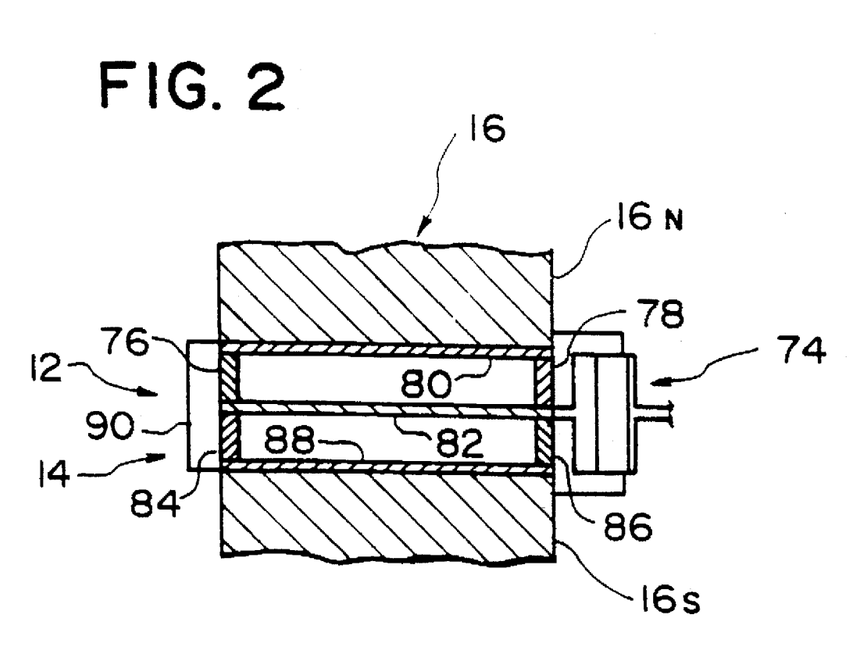
FIG. 2 is a cross-sectional view taken along line II—II of FIG. 1.

As shown in FIG. 2, the two ducts 12 and 14 pass in close proximity to each other at a medial portion thereof through the gap formed between the north and south poles 16n and 16s of the permanent magnet 16. Motion of the liquid metal in the presence of the magnetic field produces an alternating current. The portion of each duct 12 and 14 which passes through the gap comprises a separate Hartmann duct portion capable of transferring electrical energy to an output transformer 74. The single Hartmann duct is known. When liquid metal is forced through a Hartmann duct, a transverse electromotive force is generated, and a current will flow through a circuit connected to the conducting plates at each side of the duct.

The Hartmann portion of duct 12 includes two conductive side plates 76 and 78 and two non-conductive top and bottom plates 80 and 82. The Hartmann portion of duct 14 includes two conductive side plates 84 and 86 and a non-conductive top plate 82 (shared with duct 12) and a non-conductive bottom plate 88. By means of the use of two ducts, with liquid metal flowing in opposite directions, the voltages are additive when the side conductors are connected to each other at one side through a bus bar 90. By forcing the liquid metal to flow back and forth in each duct in an oscillating manner, the resultant alternating voltage output at the other side can be transformed to higher voltage by the transformer 74 connected directly across the two ducts.

To prevent current from shorting across the ends, insulating vanes 92 can be inserted in the ducts 12 and 14 at both the entry and exit of the Hartmann portions. The vanes are longitudinally disposed in spaced, parallel relation to each other so as not to restrict flow therethrough. The purpose of the end vanes is to prevent the generated electric current near the ends of the ducts from circulating back through the portions of the liquid metal where there is no magnetic field to force the electric current in the preferred direction. The electrical resistance in the path through the liquid metal around the vanes must be much greater than the resistance through the external load. The number of vanes required and their length can be determined on a case by case basis.

Magnetic field shapers 93 may be used in conjunction with the vanes 92. The shapers are suitably shaped permanent magnets which provide a dual purpose. First, they augment the action of the end vanes in reducing end-running of the generated electric current in the ends of the main current stream within the duct. The second purpose is to facilitate the development of laminar magnetohydrodynamic boundary layers in the liquid metal flow in the channel entrance regions.

Devices 106 and 108 consist of Hartmann ducts with magnetic fields generated by electromagnetics. These Hartmann ducts are inserted in the channels away from the main power-generating ducts so they can provide acceleration or deceleration to the liquid metal flow selectively and separately in one channel or the other. Moreover, these devices may function selectively either as starters or synchronization controllers.

When the devices 106 and 108 are controlled to function as starters, the source of electrical power for the electromagnetics is preferably a standard automobile battery 107. The DC output of the battery 107 is converted to the appropriate AC by an electronic inverter 109. By simultaneously supplying AC electric power to the side electrodes of the Hartmann ducts and to the electromagnets, the devices 106 and 108 become electromagnetic pumps which drive the liquid metal in alternating directions, thus forcing the combustion pistons to move back and forth by means of the magnetic coupling between the liquid metal pistons and the combustion pistons. This motion, combined with appropriate fuel injection and ignition, may be continued until the liquid metal engine is operating under its own power.

An electrical feedback can be provided to the devices 106 and 108 from the AC output to provide magnetic-field drag on individual liquid metal channels to improve synchronization when required. The engine will not require synchronization by the feedback synchronizers while the engine is delivering power because computer metering of the fuel quantity injected will regulate the velocity of the pistons. However, whenever the engine must reduce the oscillation frequency, for example, when the vehicle is braking, the metering of fuel injection may not be sufficient to maintain synchronicity.

The amount of drag provided will depend on both the magnetic field strength generated by the electromagnets and the resistive loads into which the electrical output of these Hartmann ducts are fed. The degree of drag can thus be controlled by varying the current to the electromagnets and, additionally, if necessary, by varying the load resistance.

An alternate power source to provide current to the electromagnets in the synchronization mode may be obtained while braking by switching the propulsion drive motors at the wheels of the vehicle to the generator mode. This power source may also be used in emergencies to start the liquid metal engine by pushing the vehicle or rolling it down a hill.

Since the fluid-moving pistons are free, in that they are not restricted in stroke-length by attachment to a connecting rod and crankshaft of fixed radius such as in standard reciprocating engines, the stroke length can be varied continuously by adding or removing liquid metal from the oscillating ducts. Two reservoirs 94 and 96 are provided in fluid communication with the duct 12. Servo-motors drive bellows-sealed pistons 98 and 100 to add or subtract fluid from the duct as needed. In FIG. 1, the pistons 98 and 100 are in the fully upward position and the reservoirs are filled to capacity. As the pistons 98 and 100 are caused to move downwardly, additional liquid metal is added to the duct 12. Similar reservoirs 102 and 104 are in fluid communication with the duct 14 and have servomotors which drive bellows-sealed pistons 106 and 108, respectively. Since flow in the two ducts is synchronous but in opposite directions, the amount added or subtracted from each duct should be the same.

The preferred embodiment of combustion cylinders are side-ported, and thus, a sliding exhaust port sleeve is moved in conjunction with liquid metal addition or removal to accommodate the change in piston stroke length. The result is an internal combustion engine configuration that leads to a highly efficient two-cycle exhaust and fuel injection cycle.

The two cycle is illustrated in FIGS. 3(a) through 3(j), in which a single combustion cylinder 110 is shown at various stages during the cycle. The cylinder 110 is similar to the combustion cylinders illustrated in FIG. 1 except that the combustion piston 112 has an integrally formed solid shank 114, and the fluid-driving piston 116 is formed on the end of the shank. A hermetic seal is provided in the combustion cylinder 110 where the shank 114 passes through the end of the combustion chamber 118.

Figure 3A:
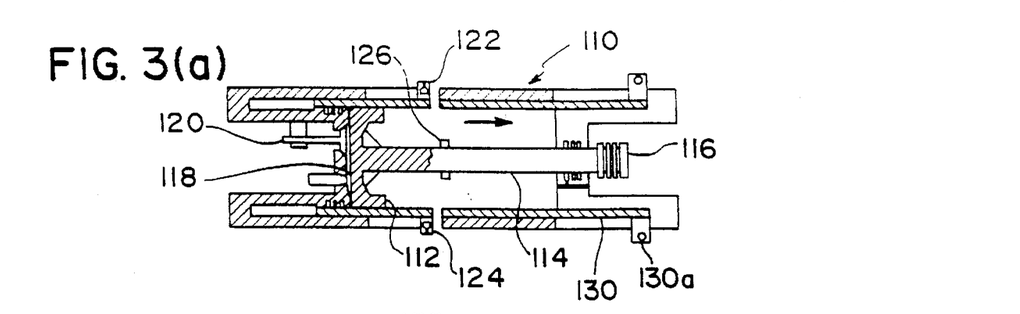
FIGS. 3(a) through 3(j) are sequential, vertical cross-sectional views of a combustion cylinder of the present invention, showing a two cycle operating condition.
Figure 3B:
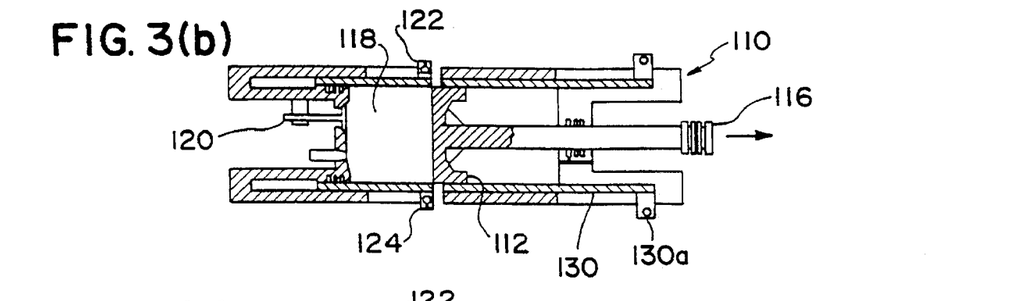

FIG. 3(a) illustrates the piston 112 in its position just before the expansion phase of the cycle. Upon ignition of fuel and compressed air in the combustion chamber 118 the piston 112 is forced to move from left to right in the illustration. At the time of ignition, a cylinder head exhaust valve 120 is in a seated position, and side port valves 122 and 124 are open. FIG. 3(b) shows the position of the piston 112 at the end of the expansion phase, at which point the piston 112 has not yet cleared the exhaust valves 122 and 124, and the cylinder head exhaust valve 120 remains seated. As a result of the left-to-right movement of the piston 116 during the expansion phase, liquid metal is caused to move in the same direction as the piston 116, which is disposed in a corresponding liquid metal duct (not shown).

Figure 3C:
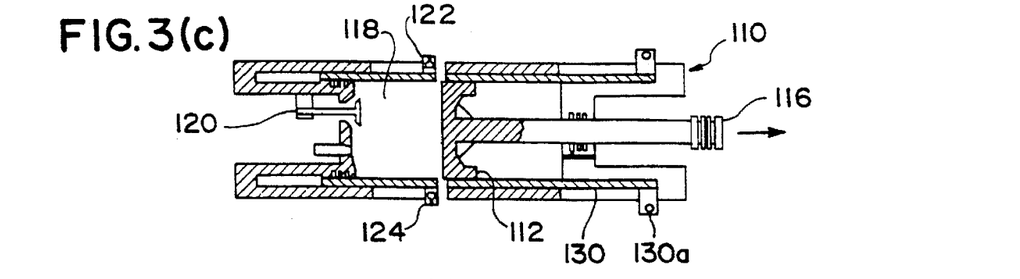
Figure 3D:
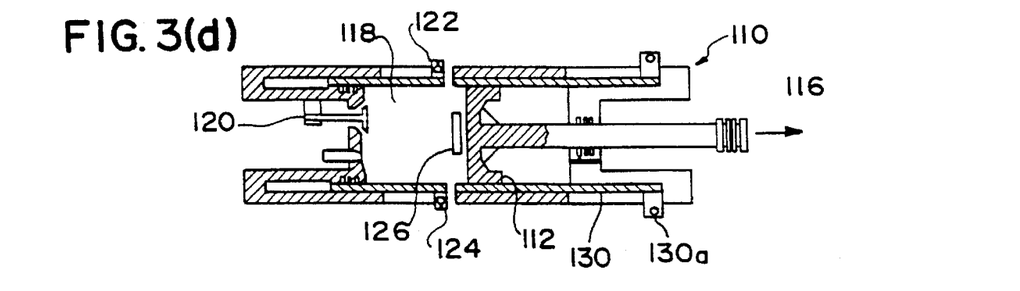
Figure 3E:
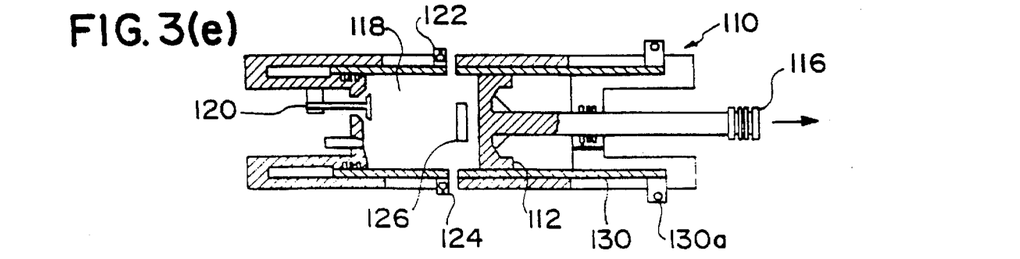

In FIG. 3(c) the piston 112 has moved into position to initiate the exhaust phase of the cycle, at which point the exhaust valve 120 opens. FIG. 3(d) shows the piston 112 in position for the exhaust and air flush phase of the cycle, at which point a side port inlet valve 126 is exposed in the combustion chamber 118 to introduce pressurized air. As the piston 112 moves further to the right, as seen in FIG. 3(e), the air flush phase continues with all valves open.

Figure 3F:
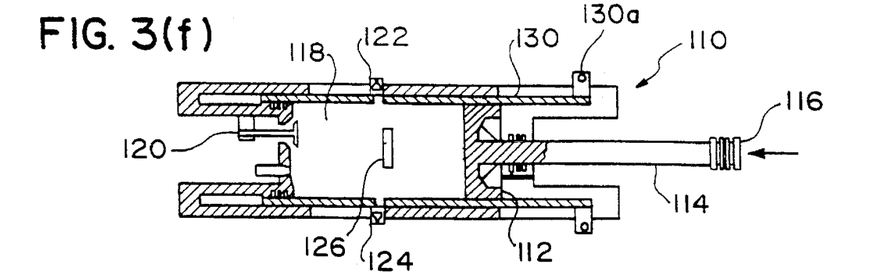
Figure 3G:
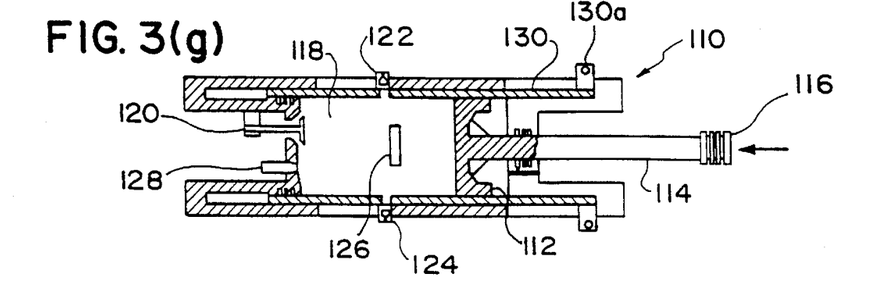
Figure 3H:
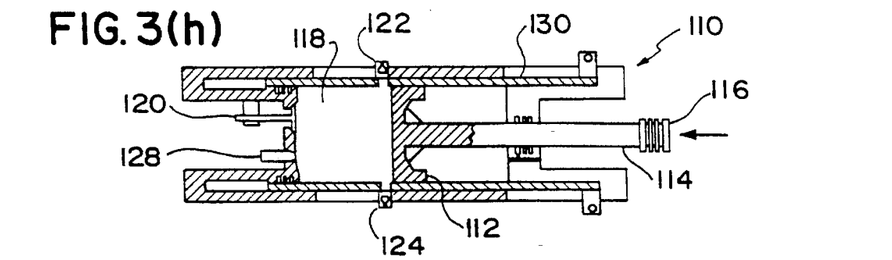

The air flush phase continues as the piston 116 begins to move to the left, as shown in FIG. 3(f), due to the beginning of the expansion phase of an opposite combustion cylinder working from the opposite side of the liquid metal duct. However, as the piston 116 begins to move to the left, the valves 122 and 124 are moved to a seated position. Air flush continues, as shown in FIG. 3(g), until the piston 112 clears the side port inlet valve 126, at which point the compression phase begins. As shown in FIG. 3(h), at the beginning of the compression phase, the cylinder head exhaust valve 120 is actuated to attain a seated position.

Figure 3I:
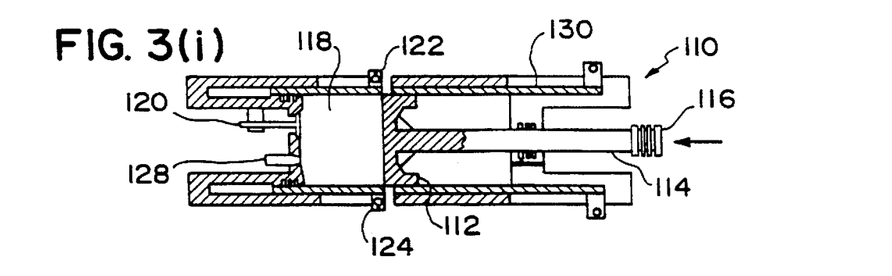
Figure 3J:
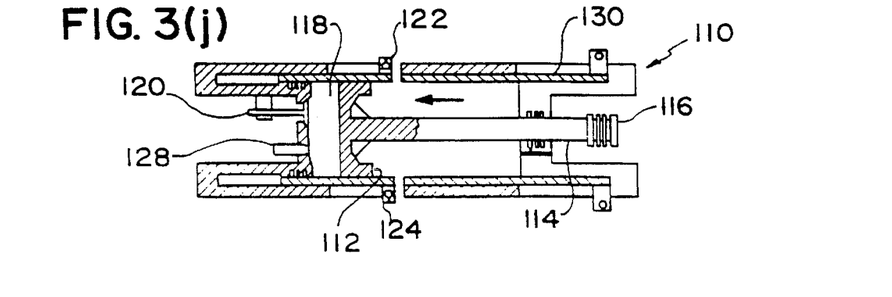

Shortly after the beginning of the compression phase, as shown in FIG. 3(i), a fuel injector 128 injects an atomized fuel or combustible gas (such as methane or hydrogen) into the combustion chamber 118 and, at the completion of the compression phase, the fuel is ignited by conventional ignition means (not shown). As shown in FIG. 3(j), the valves 122 and 124 are positioned open in anticipation of the expansion phase.

The side-ported internal combustion engines described above are provided with sliding, adjustable exhaust port sleeves, such as sleeve 130 in FIGS. 3(a) through 3(j), which are adjusted axially according to the desired stroke length. The position of the four sleeves can be adjusted using any suitable actuator means, such as servomotors (not shown) respectively coupled to lugs 130a associated with each sleeve. If the stroke length is shortened by adding liquid metal to the corresponding duct, the side port inlet and exhaust valves 122, 124 and 126 are positioned by a corresponding distance closer to the cylinder head.

Conventional means (not shown) can be employed for actuating the various valve members, and for timing the ignition of compressed fuel and air at the initiation of the expansion phase.

One use of the engine described above is to provide variable electrical frequencies corresponding to power demands for vehicular propulsion, in such a manner that a transmission or power converter device is not required. Further, the engine will maintain nearly constant efficiency throughout the range of power usage. For acceleration on Interstate ramps, for example, where maximum power of 40–60 watts per kg of vehicle mass is desirable for 6–10 second acceleration time to 60 m.p.h., typical auto wheel turning rates vary from near zero to about 15 revolutions per second, varying slightly with wheel size. By varying piston stroke and frequency, combined with switchable multiple-pole AC drive motors at the wheels of the vehicle, maximum power can be delivered throughout the range of increasing frequencies without the use of a transmission or power converter device. When the desired constant speed is attained, the stroke length can be reduced to provide 4–6 watts per kg of vehicle mass to overcome air drag and friction, without loss of efficiency. For climbing hills, additional power at constant frequency can be obtained by increasing stroke, thus maintaining constant speed without loss of efficiency.

Vibration is eliminated by using four pistons with each opposed pair moving in opposing directions. The use of a double duct allows the magnetic field of a single magnet to interact with both the liquid metal flows produced by the two pairs of oscillating pistons. The opposing direction of liquid metal flows in the double duct results in addition of voltages produced by each duct.

Output parameters for Hartmann MHD electric generators, such as amperage, voltage, power, and efficiency, are described in terms of the Hartmann number, usually designated M, and defined by $$M = y_o B[\delta/(\rho v)]^{1/2}$$

where $y_o$ is the magnetic gap of the duct, B is the magnetic induction, $\delta$ is the electric conductivity of the liquid metal, $\rho$ is the density, and $v$ is the kinematic viscosity. For fully established laminar flow of liquid metal in a duct with a moderate to high Hartmann number (and greater than 10) the velocity profile is constant across most of the duct. If an external resistance is connected to the electrodes, with a resistance preferably in the vicinity of that required for maximum power transfer and that required for maximum efficiency, the resulting Hartmann MHD generator can be treated approximately as a stackable battery cell. To achieve this result, however, the liquid metal fluid flow must be maintained. In other words, when the negative electrode of one generator is connected to the positive electrode of another generator, the voltage across the unconnected electrodes of the two generators will be the sum of the voltages of each generator.

Although the preferred embodiment has been described as including an internal combustion drive mechanism, other drive mechanisms may be employed, including Stirling engines. Also, an eight-piston device could be constructed with four ducts in the magnet. In a further variation, the magnetohydrodynamic engine could be used as a stationary generator where variable loads are encountered, such as for electric power generation at remote sites where commercial power is not available, or as a source for portable electric welding devices.

In an alternative embodiment, a layer of permanent magnet material can be placed in the medial region between the upper and lower Hartmann ducts. This layer may become necessary to ensure uniform strength of the magnetic field through both ducts.

Operation of the engine will rely on a controller (not shown) capable of monitoring and controlling the various components of the engine. Real time input data will include pressures in the combustion chambers and in the liquid metal, velocities of the pistons and the liquid metal, and operator demands. Output will include metering of fuel injection, firing of ignition devices, operation of the synchronicity devices, and, possibly, control of valve operations.

While advantageous embodiments have been chosen to illustrate the subject invention, it will be understood by those skilled in the art that various changes and modifications can be made therein without departing from the scope of the invention as defined by the appended claims.

What is claimed is:

1. A magnetohydrodynamic apparatus comprising:
   first sealed duct means for containing a quantity of liquid metal;
   second duct means for containing a quantity of liquid metal;
   piston means for imparting reciprocating motion in the liquid metal contained in the first and second ducts in opposite directions; and
   means for imposing a magnetic field on a portion of the first and second duct means, thereby generating an AC electric potential.

2. A magnetohydrodynamic apparatus according to claim 1, wherein each of the first and second duct means includes a Hartmann duct portion having top and bottom insulating walls and two opposite side conductive walls.

3. A magnetohydrodynamic apparatus according to claim 2, wherein the Hartmann duct portions of the first and second duct means are vertically stacked and assembled to include a common insulating wall therebetween, the side conductive walls of each being vertically aligned.

4. A magnetohydrodynamic apparatus according to claim 1, wherein the means for imposing a magnetic field comprises a permanent magnet having north and south pole pieces separated by a gap.

5. A magnetohydrodynamic apparatus according to claim 4, wherein each of the first and second duct means includes a Hartmann duct portion which converge one over the other in the gap of the permanent magnet.

6. A magnetohydrodynamic apparatus according to claim 5, wherein the Hartmann duct portions of the first and second duct means comprise three spaced apart parallel insulating plates, first and second side wall electrodes disposed between an upper-most one and medial one of the three insulating plates to form the Hartmann portion of the first duct means, and third and fourth side wall electrodes disposed between a lower-most one and the medial one of the three insulating plates to form the Hartmann portion of the second duct means.

7. A magnetohydrodynamic apparatus according to claim 6, further comprising a bus bar electrically connecting the first and third side wall electrodes, and a transformer electrically connected to the second and fourth side wall electrodes.

8. A magnetohydrodynamic apparatus according to claim 1, wherein the each of the first and second duct means includes first and second opposite end portions.

9. A magnetohydrodynamic apparatus according to claim 8, further comprising first and second fluid-moving pistons disposed respectively in the first and second opposite end portions of the first duct means for confining the liquid metal therebetween, and third and fourth fluid-moving pistons disposed respectively in the opposite end portions of the second duct means for confining the liquid metal therebetween.

10. A magnetohydrodynamic apparatus according to claim 9, wherein the means for imparting reciprocating motion comprises an internal combustion engine having first, second, third and fourth reciprocating combustion pistons coupled respectively to the first, second, third and fourth fluid-moving pistons through coupling means.

11. A magnetohydrodynamic apparatus according to claim 10, wherein the coupling means comprise magnetic material imposing a magnetic attraction between the combustion pistons and corresponding fluid-moving pistons.

12. A magnetohydrodynamic apparatus according to claim 11, wherein the first and second opposite end portions of the first and second duct means are made of non-conductive composite material.

13. A magnetohydrodynamic apparatus according to claim 12, wherein each combustion piston includes a hollow shank which slidably engages corresponding end portions of the first and second duct means.

14. A magnetohydrodynamic apparatus according to claim 1, further comprising means for adjusting the amount of liquid metal in each of the first and second duct means.

15. A magnetohydrodynamic apparatus according to claim 10, further comprising means for adjusting the amount of liquid metal in each of the first and second duct means.

16. A magnetohydrodynamic apparatus according to claim 15, wherein the adjusting means comprises first and second liquid metal reservoirs in fluid communication with the first duct means, and second and third liquid metal reservoirs in fluid communication with the second duct means, a stroke length of the combustion pistons varying in accordance with variations in the amount of liquid metal in the first and second duct means.

17. A magnetohydrodynamic apparatus according to claim 16, wherein each combustion piston is disposed in a corresponding combustion cylinder having a side-ported adjustable sleeve, the sleeve being positionally adjustable to correspond to changes in combustion piston stroke length.

18. A magnetohydrodynamic apparatus comprising:

a first duct having first and second closed, opposite axial ends and a Hartmann portion disposed between the opposite axial ends;

a second duct having first and second closed, opposite axial ends and a Hartmann portion disposed between the opposite axial ends;

the Hartmann portions of the first and second ducts being formed by three vertically spaced apart insulating plates, first and second conductive side electrode plates disposed between an upper-most one and a medial one of the three insulating plates, and third and fourth conductive side electrode plates disposed between a lower-most one and the medial one of the three insulating plates;

a permanent magnet having north and south pole pieces and a gap, the Hartmann portions of the first and second ducts being disposed in the gap of the permanent magnet;

first and second fluid-moving pistons disposed in opposite end portions of the first duct and confining a quantity of liquid metal therebetween;

third and fourth fluid-moving pistons disposed in opposite end portions of the second duct and confining a quantity of liquid metal therebetween; and means for imparting synchronous, reciprocating motion in the first, second, third and fourth fluid-moving pistons to thereby impart reciprocating movement of liquid metal through the first and second ducts in opposite directions.

19. A method of producing AC electric current comprising the steps of:

containing a quantity of liquid metal in first duct means;

containing a quantity of liquid metal in a second duct means;

juxtaposing a portion of the first and second duct means;

imparting reciprocating motion in the liquid metal contained in the first and second duct means in opposite directions; and imposing a magnetic field on the juxtaposed portions of the first and second duct means, thereby generating an AC electric potential as the liquid metal passes through the magnetic field in opposite directions.

20. A method according to claim 19 wherein the step of imparting reciprocating motion comprises driving fluid-moving pistons disposed in opposite ends of each of the first and second duct means with an internal combustion engine.

21. A magnetohydrodynamic apparatus comprising:

first duct means for containing a quantity of liquid metal;

second duct means for containing a quantity of liquid metal;

internal combustion means, disposed at opposite ends of each of the first and second duct means, for imparting reciprocating motion in the liquid metal contained in the first and second ducts in opposite directions;

starter means, disposed in the first and second duct means, for starting the internal combustion means; and field means for imposing a magnetic field on a portion of the first and second duct means, thereby generating an AC electric potential.

22. A magnetohydrodynamic apparatus according to claim 21, wherein the starter means comprises first and second Hartmann devices disposed respectively in the first and second duct means.

23. A magnetohydrodynamic apparatus according to claim 22, wherein each of the first and second Hartmann devices includes an AC electromagnetic, and two opposite side electrodes.

24. A magnetohydrodynamic apparatus according to claim 23, further comprising a DC power source having an inverted AC output simultaneously coupled to the field means, and to the electromagnets and two opposite side electrodes of the first and second Hartmann devices.

* * * * *